United States Patent Office 2,952,678
Patented Sept. 13, 1960

2,952,678

PREPARATION OF HALOGENATED PHENOXY-ALKYL SUBSTITUTED AMINES

Earl W. Lane, Philadelphia, Pa., assignor to Rohm & Haas Company, Philadelphia, Pa., a corporation of Delaware No Drawing. Filed Dec. 24, 1956, Ser. No. 630,028

6 Claims. (Cl. 260—247.7)

This invention relates to a new and improved method for preparing a series of halogenated phenoxyalkyl substituted amines which are useful primarily as starting materials in the preparation of numerous end products. It has specific reference to a process for preparing said amines by reacting a polyhalogenated benzene with a hydroxyalkylated amine and an alkali metal having an atomic weight of from about 23 to about 39 (either sodium or potassium) in its metallic, hydroxide or hydride form.

A principal object of this invention has been to provide a process for manufacturing the above-mentioned series of amines which makes their use as chemical intermediates exceptionally desirable from an economical standpoint because (a) the process is relatively simple and results in comparatively high yields, and (b) the materials employed are readily available and comparatively inexpensive. This object has been accomplished, and so have others as will become obvious from the description of the invention which follows, by a reaction which may be illustrated as follows:

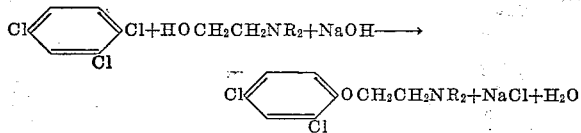

The illustrated reaction has been successfully run with a number of different polyhalogenated benzenes, principally 1,2-dichloro, 1,4-dichloro, 1,2,3- and 1,2,4-trichloro- and 1,2,4,5-tetrachlorobenzenes, and some mixtures thereof. The polyhalogenated benzenes of major interest are the ones in which the halogen has an atomic weight of from about 35 to about 80. Of particular interest is the fact that the far less expensive, commercially available technical trichlorobenzene, which is a mixture of 1,2,3- and 1,2,4-trichlorobenzenes, can be employed in this reaction with considerable success. In the simplest form of the present invention, wherein the novel reaction is effected in a "one-step" operation by heating all the principal substances together, simultaneously, the polyhalogenated benzene is reacted directly with sodium or potassium hydroxide or hydride and a hydroxyalkylated amine from a large group which includes the following:

Monoethanolamine
Monoisopropanolamine
3-aminopropanol
Aminoethyl ethanolamine
Polyglycolamine [H(OCH$_2$CH$_2$)$_x$NH$_2$]
2-amino-2-methyl-1-propanol
1,3-diamino-2-propanol
Dimethylaminoethanol
Dimethylisopropanolamine
Hydroxyethylmorpholine
N-methylmonoethanolamine
t-Dodecylaminoethanol The reaction will thus be seen to be capable of being carried out with amino-substituted alcohols containing primary, secondary, and tertiary amine groups. The reaction can be performed with primary, secondary, or tertiary alcohols, although it is preferable, at least from an economical standpoint, to employ primary alcohols. Similar successful reactions, with somewhat lesser yields, have been performed with other polyhalogenated benzenes, namely o-dichlorobenzene, p-dichlorobenzene, p-dibromobenzene, and 1,2,4-tribromobenzene.

Illustrative of the highly useful and novel amines obtainable by means of the novel reaction described above are dichlorophenoxyethylamine and N-(dichlorophenoxyethyl)-N,N-dimethyl amine. Both of them are producible quite inexpensively in yields of about 70% (based on the amine). The former has been usefully employed as a pesticide and also in the preparation of: herbicides such as the mono and bis-ureas; N-dichlorophenoxyethyl α-methacryloxy acetamide as a monomer for adhesives; N-dichloro-phenoxyethyl methacrylamide as a monomer for lube oil additives; et al. The latter has been used primarily as an intermediate for the preparation of bactericides.

The reaction of the present invention is well illustrated by the procedure set forth in the examples below. Examples 1 to 8 pertain to the "one-step" operation mentioned above in which the principal constituents are simultaneously reacted. Examples 9 and 10 pertain to a "two-step" operation. The procedure employed in Examples 9 and 10 was devised when it was discovered that three of the hydroxyalkylated amines which were tried, namely, diethanolamine, anilinoethanol, and 1-diethylamino-2-propanol, did not give an altogether satisfactory yield with the procedures set forth in Examples 1 to 8. In these cases it was found preferable first to prepare the sodium or potassium alkoxides in situ by adding metallic sodium or potassium, respectively, to the alcohols, and then follow with the addition of the trichlorobenzene. In this manner a far greater yield was obtained. This is illustrated in Example 9 which describes the preparation of N-dichlorophenoxyethyl-aniline when starting with anilino-ethanol, and in Example 10 which describes the preparation of N-dichlorophenoxyethyl-N-hydroxyethyl amine when starting with diethanolamine. Actually, the alternate procedure given in Examples 9 and 10 is suitable for use with all the other hydroxy-alkylated amines mentioned above, and may be preferred for production-type applications as it minimizes generation of heat as the polyhalogenated benzene is gradually added. Moreover, by doing it in this way, there is avoided the possibility of side reactions caused by (a) the reaction of the sodium or potassium hydroxide and trichlorobenzene, and (b) the reaction of the alkali with the aminoalkylated phenoxybenzene product.

Other commonly known methods may be used to convert the hydroxyl compound to alkoxide ion prior to the reaction with trichlorobenzene. For example, sodium or potassium hydride may be used in place of the metallic sodium or potassium, or the hydroxides of sodium or potassium, cited above and in the examples.

EXAMPLE 1a

*Preparation of dichlorophenoxyethylamine*

Into a 500 ml. three-necked flask were charged the following:

Monoethanol amine, _____ 45.8 g. (0.75 mol)
Micropulverized sodium hydroxide,__ 80.0 g. (2.0 mol)
Technical trichlorobenzene,[1] _____ 272.3 g. (1.5 mol)

[1] Supplied by the Hooker Electrochemical Company whose advertising literature describes this material as containing about 15 to 25% of 1,2,3-trichlorobenzene and about 75 to 85% of 1,2,4-trichlorobenzene.

The flask was equipped with a thermometer, stirrer, and reflux condenser. The mixture was heated to between 125° to 132° C. and kept at that temperature for approximately eight hours. The reaction mixture was washed twice, each time with 200 ml. of distilled water, and the organic matter was then distilled off, the fraction between 149° and 177° C., at 15 mm. Hg pressure, being collected, most of it distilling over between 170° to 177° C. The yield of this fraction was 110.4 g. (71% of theory based on monoethanol amine). Analysis indicated 6.8% total titratable nitrogen, all of which was primary amine nitrogen. Theory for dichlorophenoxyethylamine is 6.8% N. Refractive index ($n_D^{25}$) was 1.5630.

EXAMPLE 1b

In similar fashion the same product was prepared in 70% yield using pulverized KOH in place of NaOH.

EXAMPLE 2

*Preparation of N-(dichlorophenoxyethyl)-N,N-dimethylamine*

In a 500 ml. three-necked flask were charged the following:

N,N-dimethylaminoethanol, 63.4 g. (0.7 mol)
NaOH (pulverized), 39.2 g. (0.98 mol)
Technical trichlorobenzene, 127.0 g. (0.7 mol)

The flask was equipped with a thermometer, stirrer, reflux condenser, and inlet tube for an inert gas. The contents of the flask were heated to 81° C. while passing in a slow stream of nitrogen. The contents of the flask were then heated under an atmosphere of nitrogen for 5.5 hours at 140° to 150° C. The reaction mixture was then cooled, diluted with 200 ml. of water, made acid with 90 ml. of 12% aqueous hydrochloric acid and extracted with 82 ml. of benzene. The aqueous layer from the extraction was then made basic with 10% NaOH, extracted with ether, and the extract concentrated on a steam bath. Distillation of the ether extract gave a fraction boiling at 151° to 163° C./15 mm. Hg pressure. It weighed 73.7 g. and had a refractive index ($n_D^{25}$) of 1.5340. The titratable nitrogen content was 6.0% (theory for N-(dichlorophenoxyethyl)-N,N-dimethylamine is 6.0%).

EXAMPLE 3

*Preparation of p-chlorophenoxyethylamine* p-Dichlorobenzene (73.5 g., 0.5 mol), monoethanolamine (61 g., 1.0 mol) and sodium hydroxide (40 g., 1.0 mol) were heated and stirred twenty hours at 150° to 154° C. The reaction mixture was worked up as in Example 1. The product, which was p-chlorophenoxyethylamine, weighed 41 g. It boiled at 157° to 164° C. at 29 mm. Hg pressure. It had a neutral equivalent of 171 and a refractive index ($n_D^{25}$) of 1.5483.

EXAMPLE 4

*Preparation of dibromophenoxyethylamine*

1,2,4-tribromobenzene (63 g., 0.2 mol), monoethanolamine (5.7 g., 0.1 mol) and sodium hydroxide (10.8 g., 0.27 mol) were heated and stirred five hours at 130° to 143° C. The product was worked up as in Example 1, except that it was not distilled. After stripping under reduced pressure to remove unreacted tribromobenzene and monoethanolamine the residue weighed 5.3 g. It had a neutral equivalent of 335. Theory for dibromophenoxyethylamine is 295.

EXAMPLE 5

*Preparation of N-(dichlorophenoxyethyl)-t-dodecylamine*

A mixture of 114.5 g. (0.5 mol) of t-dodecylaminoethanol, 181.5 g. (1.0 mol) of technical trichlorobenzene, which was mainly the 1,2,4 isomer, and 60 g. (1.5 mol) of pulverized sodium hydroxide was heated and agitated six hours at 147° to 157° C. The reaction mixture was washed with two 300 ml. portions of water. The organic layer was then distilled and the product collected at 188° to 203° C. at 1.4 mm. Hg pressure. The product weighed 90 g. It had a neutral equivalent of 373. The theoretical value for N-dichlorophenoxyethyl-t-dodecylamine is 374.

EXAMPLE 6

*Preparation of N,N-dimethyl-2-(dichlorophenoxy) propylamine*

A mixture of 51.5 g. (0.5 mol) of 1-dimethylamino-2-propanol, 181.5 g. (1.0 mol) of technical trichlorobenzene, and 54 g. (1.35 mols) of pulverized sodium hydroxide was heated and agitated 4.4 hours at 144° to 154° C. The reaction mixture was washed with water as in the preceding example and was distilled. The product, weighing 62 g. was collected at 138° to 147° C. at 10 mm. Hg pressure. It had a neutral equivalent of 258. Theory for N,N-dimethyl-2-(dichlorophenoxy) propylamine is 248.

EXAMPLE 7

*Preparation of N(dichlorophenoxyethyl)morpholine*

A mixture of 65.5 g. (0.5 mol) of N-hydroxyethylmorpholine, 181.5 g. (1.0 mol) of trichlorobenzene, and 54 g. (1.35 mols) of sodium hydroxide was heated and agitated 4.3 hours at 125° to 140° C. The product was washed with water and distilled. The product weighing 83 g., was collected at 156° to 169° C. at 0.5 mm. Hg pressure. It had a neutral equivalent of 273. Theory for the product is 277. The refractive index ($n_D^{25}$) was 1.5482.

EXAMPLE 8

*Preparation of N-(dichlorophenoxyethyl)methylamine*

A mixture of 37.5 g. (0.5 mol) of N-methylaminoethanol, 181.5 g. (1.0 mol) of technical trichlorobenzene, and 54 g. (1.35 mols) of pulverized sodium hydroxide was heated and agitated 6.2 hours at 129° to 136° C. The reaction mixture was washed with water and distilled. The product boiled at 140° to 145° C. at 1.5 mm. Hg pressure. The yield was 82 g. The neutral equivalent was 232. Theory for N(dichlorophenoxyethyl)methylamine is 220.

EXAMPLE 9

*Preparation of N-(dichlorophenoxyethyl) aniline*

Into a 1000 ml. three-necked flask was charged 164 g. (1.2 mols) of anilinoethanol. The flask was equipped with a thermometer, stirrer, and addition funnel. The amine was heated to 100° C. under an atmosphere of nitrogen, and a total of 23 g. of metallic sodium was gradually added while the temperature was maintained at 100° to 105° C. At this point the nitrogen was discontinued and 217.8 g. (1.2 mols) of trichlorobenzene was gradually added. The resulting mixture was clear and in a single phase. The heating was continued for about eighteen hours at temperatures of between 120° and 140° C. About 200 ml. of distilled water was then added, the mixture well shaken and the organic layer which formed was separated off and distilled. The fraction obtained between 136° and 224° C., at 6 mm. Hg pressure, was collected, the yield being 95.8 g. ((27% of theory, based on anilinoethanol).

EXAMPLE 10

*Preparation of N-(dichlorophenoxyethyl)-N-hydroxyethylamine*

To 21.0 g. (0.2 mol) of diethanolamine was added 7.8 g. (0.2 mol) of metallic potassium. The mixture was stirred and heated under an atmosphere of nitrogen for two hours. To this was added 54.5 g. (0.3 mol) of trichlorobenzene. The reaction mixture was heated under nitrogen for twenty-four hours at 120° to 130° C. The reaction mixture was then taken up in 200 ml. of toluene and was centrifuged to remove potassium chloride. The toluene solution was then distilled. A fraction boiling at 170° to 190° C./0.6 mm. was collected. It contained by analysis 5.4% titratable nitrogen. Theory for N-dichlorophenoxyethyl-N-hydroxyethylamine is 5.5%.

I claim:

1. The process for preparing a compound of the formula

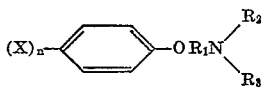

where X is selected from the group of halogens consisting of chlorine and bromine, $n$ is an integer of from 1 to 3, $R_1$ is an alkylene radical from the class consisting of ethyl and propyl, and $R_2$ and $R_3$ are members of the class consisting of hydrogen and alkyl, oxyalkyl, aminoalkyl and phenyl groups, which comprises condensing for at least about four hours at a temperature of between about 120° C. and about 157° C. a polyhalogenated benzene of the formula

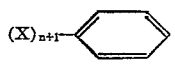

with an aminoalkoxide of the formula

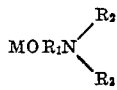

said aminoalkoxide having been formed from a hydroxyalkylated amine of the formula

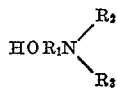

the values for X, $n$, $R_1$, $R_2$, and $R_3$ being the same as given above, and M is an alkali metal selected from the class consisting of sodium and potassium.

2. The process of claim 1 in which the polyhalogenated benzene is selected from the group consisting of o-dichlorobenzene, p-dichlorobenzene, 1,2,3-trichlorobenzene, 1,2,4-trichlorobenzene, 1,2,4,5-tetrachlorobenzene, p-dibromobenzene, 1,2,4-tribromobenzene, and a mixture of 1,2,3-trichlorobenzene and 1,2,4-trichlorobenzene.

3. The process of claim 1 in which the hydroxyalkylated amine is selected from the group consisting of monoethanolamine, monoisopropanolamine, 3-aminopropanol, aminoethyl ethanolamine, polyglycolamine, 2-amino-2-methyl-1-propanol, 1,3-diamino-2-propanol, dimethylaminoethanol, dimethyl isopropanolamine, N-methylmonoethanolamine, and t-dodecylaminoethanol.

4. The process for preparing a compound of the formula

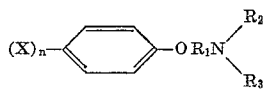

where X is selected from the group of halogens consisting of chlorine and bromine, $n$ is an integer of from 1 to 3, $R_1$ is an alkylene radical from the class consisting of ethyl and propyl, and $R_2$ and $R_3$ taken together constitute an oxyalkylene radical, which comprises condensing for at least about four hours and at a temperature of from about 120° C. to about 157° C. a polyhalogenated benzene of the formula

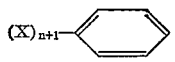

with an aminoalkoxide of the formula

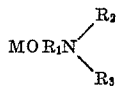

said aminoalkoxide having been formed from a hydroxyalkylated amine of the formula

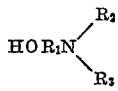

the values for X, $n$, $R_1$, $R_2$, and $R_3$ being the same as given above, and M is an alkali metal selected from the class consisting of sodium and potassium.

5. The process of claim 4 in which the polyhalogenated benzene is selected from the group consisting of o-dichlorobenzene, p-dichlorobenzene, 1,2,3-trichlorobenzene, 1,2,4-trichlorobenzene, 1,2,4,5-tetrachlorobenzene, p-dibromobenzene, 1,2,4-tribromobenzene, and a mixture of 1,2,3-trichlorobenzene and 1,2,4-trichlorobenzene.

6. The process of claim 4 in which the hydroxyalkylated amine is N-hydroxyethylmorpholine.

References Cited in the file of this patent

UNITED STATES PATENTS

| | | |
|---|---|---|
| 1,949,046 | Hartmann et al. | Feb. 27, 1935 |
| 2,577,234 | Cusic | July 2, 1947 |
| 2,738,351 | Dickison | Mar. 13, 1956 |
| 2,766,238 | Felton | Oct. 9, 1956 |

OTHER REFERENCES

Karrer: Organic Chemistry (Textbook), page 103 relied on, Nordeman Publishing Co. Inc., N.Y.; 1938 edition.

Wagner et al.: "Synthetic Organic Chemistry," pp. 226–228 (1953).